(12) United States Patent
Brecher

(10) Patent No.: US 9,561,446 B2
(45) Date of Patent: Feb. 7, 2017

(54) SPINNING TOP

(71) Applicant: Kenneth Brecher, Belmont, MA (US)

(72) Inventor: Kenneth Brecher, Belmont, MA (US)

( * ) Notice: Subject to any disclaimer, the term of this patent is extended or adjusted under 35 U.S.C. 154(b) by 0 days.

(21) Appl. No.: 15/059,875

(22) Filed: Mar. 3, 2016

(65) Prior Publication Data

US 2016/0256789 A1  Sep. 8, 2016

Related U.S. Application Data

(60) Provisional application No. 62/129,630, filed on Mar. 6, 2015.

(51) Int. Cl.
*A63H 1/00* (2006.01)
*G09B 23/06* (2006.01)
*G09B 23/02* (2006.01)

(52) U.S. Cl.
CPC ............... *A63H 1/00* (2013.01); *G09B 23/02* (2013.01); *G09B 23/06* (2013.01)

(58) Field of Classification Search
USPC ........ 446/236, 243, 256, 259, 264; 434/211, 434/213, 214, 215
See application file for complete search history.

(56) References Cited

U.S. PATENT DOCUMENTS

| | | | | |
|---|---|---|---|---|
| 1,830,367 A * | 11/1931 | McCall | | A63H 1/04 446/263 |
| 3,879,887 A * | 4/1975 | Brookson, Jr. | | A63H 1/06 446/220 |
| 4,292,756 A * | 10/1981 | Jaworski | | A63H 1/00 446/246 |
| 4,650,424 A * | 3/1987 | Mitchell | | A63F 9/12 273/157 R |
| D448,431 S * | 9/2001 | Negron | | D21/460 |
| 2009/0088043 A1* | 4/2009 | Djan | | A63H 1/00 446/236 |
| 2016/0129354 A1* | 5/2016 | Choi | | A63H 1/04 446/233 |

OTHER PUBLICATIONS

Rick Berner, "This is FlicktUp: Precision Metalsmithed Spinning Top", Nov. 18, 2014 [retrieved online Jul. 28, 2016].*
Helen Joyce, "Hardboiled Detectives", May 1, 2002 [retrieved online Jul. 28, 2016].*
Brecher, K., "Top-ology: A Torque about Tops", Proceedings of Bridges 2014: Mathematics, Music, Art, Architecture, Culture, pp. 51-58, Conference Date: Aug. 14-19, 2014.
Brecher, K., "The Φ Top: A Golden Ellipsoid", Proceedings of Bridges 2015: Mathematics, Music, Art, Architecture, Culture, pp. 371-374, Conference Date: Jul. 29-Aug. 1, 2015.
Moffatt, H.K. and Shimomura, Y. ,"Spinning eggs—a paradox resolved", Nature, vol. 416, pp. 385-386, Mar. 28, 2002.
iTopSpin.com, "FlicktUp: a Dippy Top-like on Kickstarter", Retrieved from the Intenet: http://www.ta0.com/forum/index.php?topic=3615.0, Nov. 16, 2014.

* cited by examiner

*Primary Examiner* — Kurt Fernstrom
(74) *Attorney, Agent, or Firm* — Hamilton, Brook, Smith & Reynolds, P.C.

(57) ABSTRACT

The present invention provides a new design for a spinning top. The present invention can have a prolate ellipsoid shape with a surface defined by the equation $x^2/a^2+y^2/b^2+z^2/c^2=1$.

14 Claims, 5 Drawing Sheets

SPINNING TOP

RELATED APPLICATION

This application claims the benefit of U.S. Provisional Application No. 62/129,630, filed on Mar. 6, 2015. The entire teachings of the above application are incorporated herein by reference.

BACKGROUND

Spinning tops have existed in many cultures for at least the past two millennia, and can have a variety of different shapes.

SUMMARY OF THE INVENTION

The present invention provides a new design for a spinning top. The present invention can provide a top having a prolate ellipsoid shape.

In particular embodiments, the top can have an outer surface defined by the equation:

$$x^2/a^2+y^2/b^2+z^2/c^2=1$$

in which a, b and c are constants, and x, y and z are spatial co-ordinates, and in which a ratio c/a is in a range such that 2>c/a>1. In some embodiments, the ratio c/a is equal to the golden ratio. The ratio c/a can be about 1.5-1.7. The top can be configured so that constant a=b. The top can have a length along a major axis of about 1-6 inches. The length of the top along the major axis can be in some embodiments about 2 inches, and the top can also have a diameter at a minor axis of about 1.2 inches. The ratio c/a can in some embodiments be about 1.6. The top can be configured to be initially spun on a surface such as a flat horizontal surface to rotate around a minor axis, and to rotationally move to spin about a major axis.

The present invention can also provide a top having a prolate ellipsoid shape including an outer surface defined by the equation:

$$x^2/a^2+y^2/b^2+z^2/c^2=1$$

in which a, b and c are constants, and x, y and z are spatial co-ordinates, and in which a=b, a ratio c/a is about 1.5-1.7, the top having a length along a major axis of about 1-6 inches, the top being configured to be initially spun on a surface to rotate around a minor axis, and to rotationally move to spin about the major axis.

The present invention can also provide a method of spinning a top, including providing the top with a prolate ellipsoid shape having a major axis and a minor axis. The top can be spun in the lateral position about the minor axis on a surface. The top then rotationally moves to spin about the major axis in an upright position.

In particular embodiments, the top can be provided with an outer surface defined by the equation:

$$x^2/a^2+y^2/b^2+z^2/c^2=1$$

in which a, b and c are constants, and x, y and z are spatial co-ordinates, and in which a ratio c/a is in a range such that 2>c/a>1. The top can be formed with a ratio c/a equal to the golden ratio. The top can be formed with a ratio c/a of about 1.5-1.7. The top can be formed so that constant a=b. The top can be provided with a length along a major axis of about 1-6 inches. In some embodiments, the top can be provided with the length along the major axis of about 2 inches, and a diameter at a minor axis of about 1.2 inches. The top can be provided with a ratio c/a of about 1.6.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1:
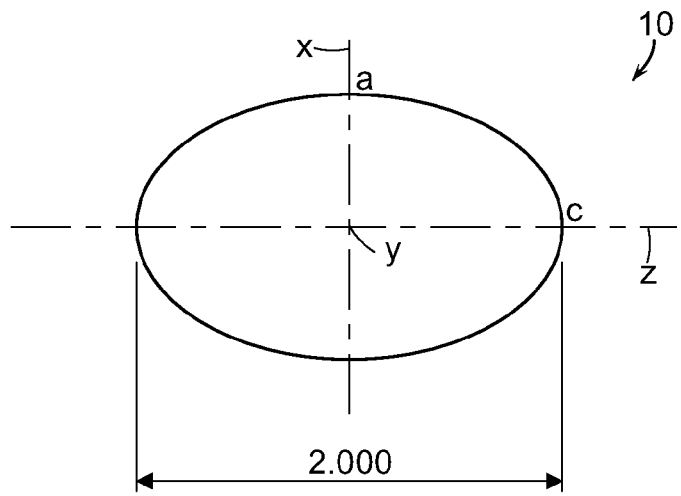
FIG. 1 is a side view of an embodiment of the present invention top positioned with the major axis in a horizontal orientation.

A description of example embodiments of the invention follows.

Referring to FIGS. 1-6, in the present invention, a new type of spinning top 10 is disclosed herein. Example embodiments of the spinning top 10 are designed to be a toy, as well as an educational device that can demonstrate concepts of physics, mathematics, and visual perception. Based on physical experiments, embodiments of the spinning top 10 have been carefully designed in the shape of a symmetrical prolate ellipsoid. A mathematical ellipsoid has an outer surface defined by the equation:

$$x^2/a^2+y^2/b^2+z^2/c^2=1$$

in which a, b and c are constants and x, y and z are spatial co-ordinates. Taking a=b, one has a symmetric oblate or prolate ellipsoid, depending on whether a>c (oblate) or a<c (prolate). Physical experiments have found that symmetric prolate ellipsoids with ratio c/a in the range from ~1.5-1.7 optimize the novel dynamical behavior of the spinning top 10 (discussed below). The ratio of the long or major axis to the short or minor axis of the prolate ellipsoid has been chosen to optimize the mechanical performance of this type of object as a spinning top 10. In a particular embodiment of the top 10, the ratio c/a has also been chosen to optimize its aesthetic appeal by selecting the value for c/a equal to the mathematical quantity called the "golden mean" or the "golden ratio" which is equal to $\Phi=(1+5^{1/2})/2 \sim 1.61803398\ldots$. This special symmetric prolate ellipsoid with the ratio of major to minor axes c/a=$\Phi$ is referred to herein as the "golden ellipsoid." This is a unique mathematical shape, which can be made in any size. With a much higher c/a ratio, the top will not stand erect when spun by hand; with a much smaller ratio of c/a, the motion is rather uninteresting. Example embodiments of prolate ellipsoidal tops may have the ratio in the range 2>c/a>1, but with emphasis on the specific golden mean ratio top with c/a=$\Phi$. Example embodiments of the spinning top can be made from any material including metal, plastic, wood or stone, such as by CNC machining, molding, forging or 3D printing. Examples of plastics can include Delrin, acrylic and PVC although other suitable plastics can be used.

In operation, the spinning top can be spun or rotated using the fingers of either one or two hands. A convenient major axis length for the top 10 embodiment can be anywhere in the range from about 1-6 inches, though larger and small sizes can also be made and readily spun by hand. The top 10 can be spun up by rotating it about its minor axis in a horizontal position. If spun rapidly enough, it will then stand up to a vertical position. After about 30-60 seconds in some embodiments and 60-120 seconds in others, it will begin to spin down towards a horizontal orientation again, and then stop. Unlike most spinning tops, which are spun with the object starting in a vertical orientation—which will then slowly lose energy and angular momentum and fall down— the top 10 starts in a horizontal orientation, rises up to a vertical orientation, and then slowly descends again to a horizontal orientation.

Other features of embodiments of the spinning top 10 are now described.

Magnetism: If the top 10 is made from a non-magnetic metal such as aluminum, brass, bronze, copper, stainless steel (or other metals), it can provide a novel magnetic demonstration of Lenz's law. While spinning in its vertical orientation, bringing a strong magnet close to the top 10 stops its rotation. This is a good demonstration of inducing eddy currents in the moving metal conductor of the top 10, which leads to energy dissipation and loss of rotation. The top 10 can provide a novel educational demonstration for use in physics instruction at a variety of levels.

Some embodiments of top 10 can be made of aluminum and can spin a longer time than those made of other metals. In some embodiments, magnetic metals, such as iron and steel can be used.

Figure 2:
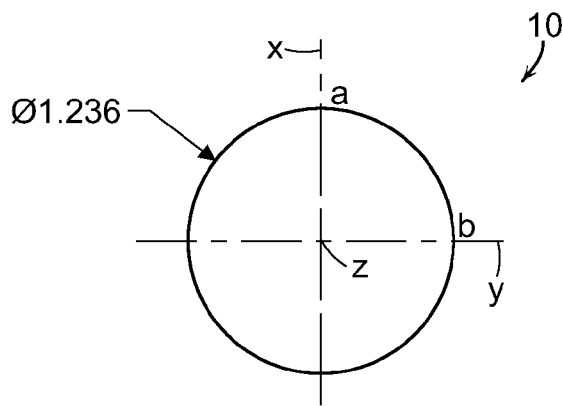
FIG. 2 is an end view thereof.
Figure 3:
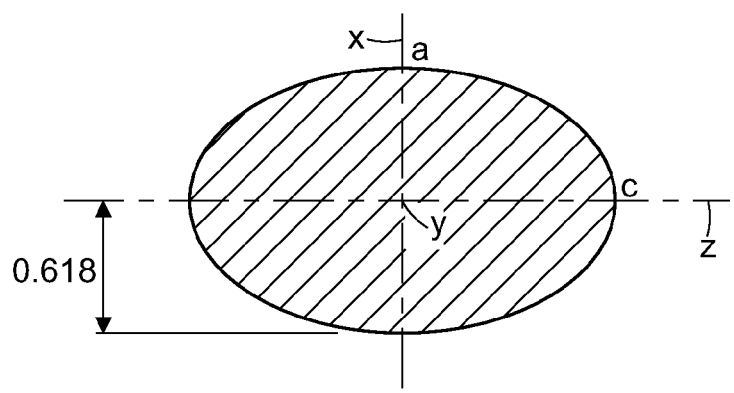
FIG. 3 is a side sectional view thereof.
Figure 4:
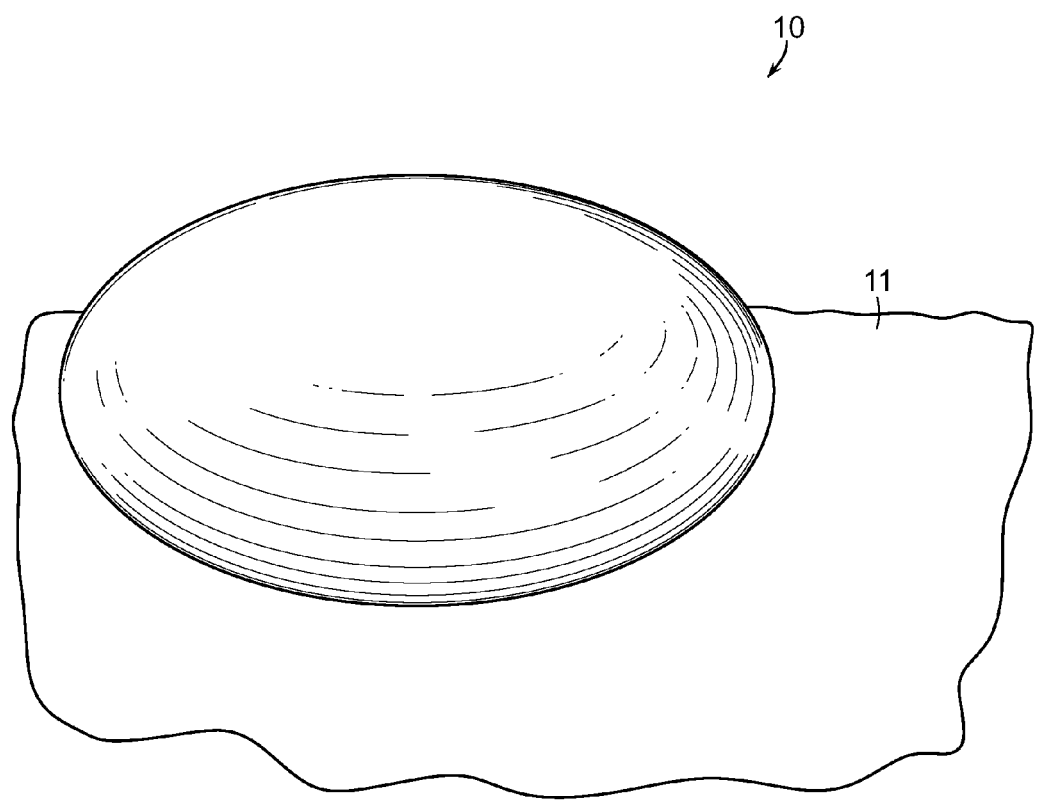
FIG. 4 is a perspective view of an embodiment in the present invention.
Figure 5:
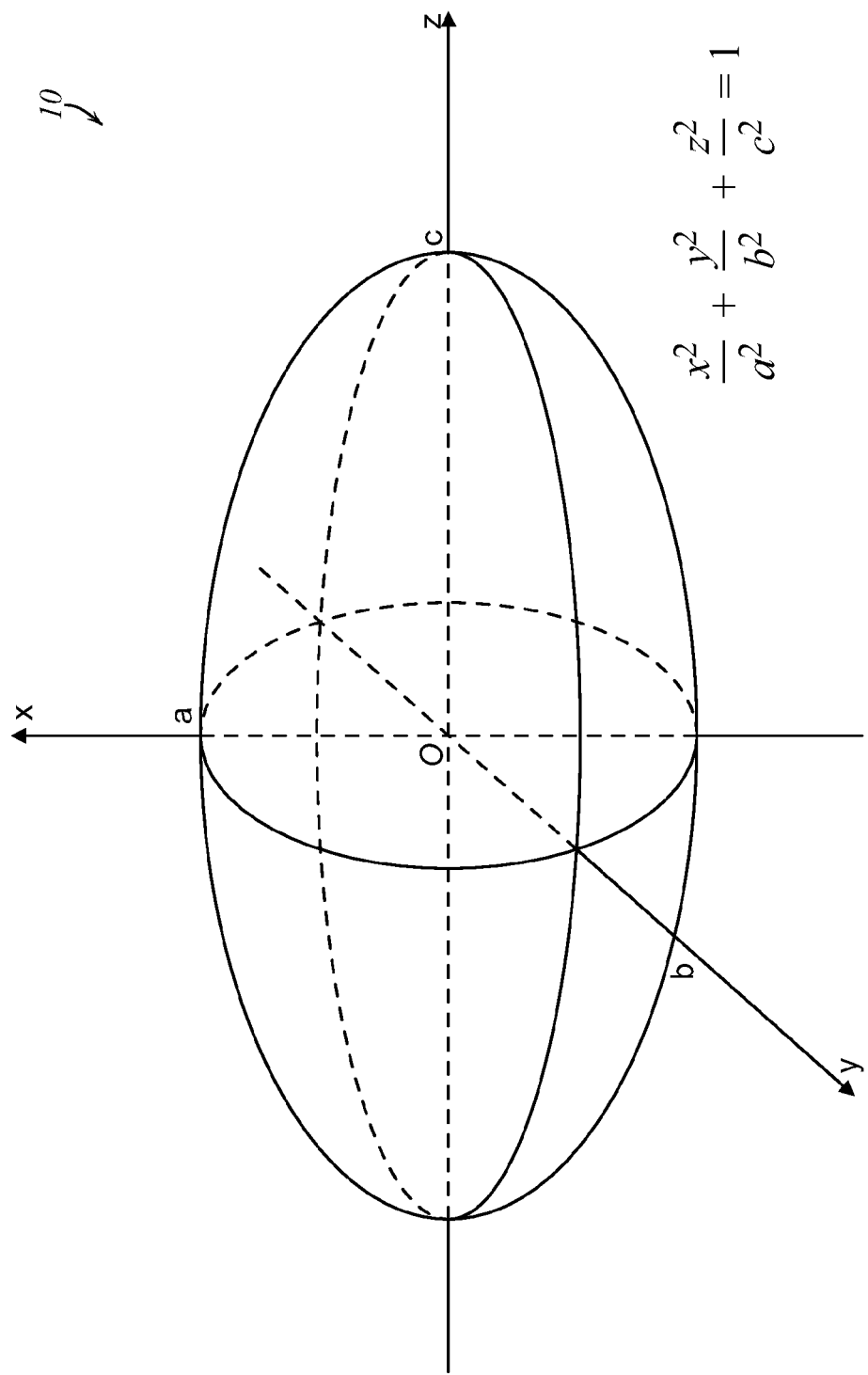
FIGS. 5 and 6 are schematic drawings of particular embodiments.
Figure 6:
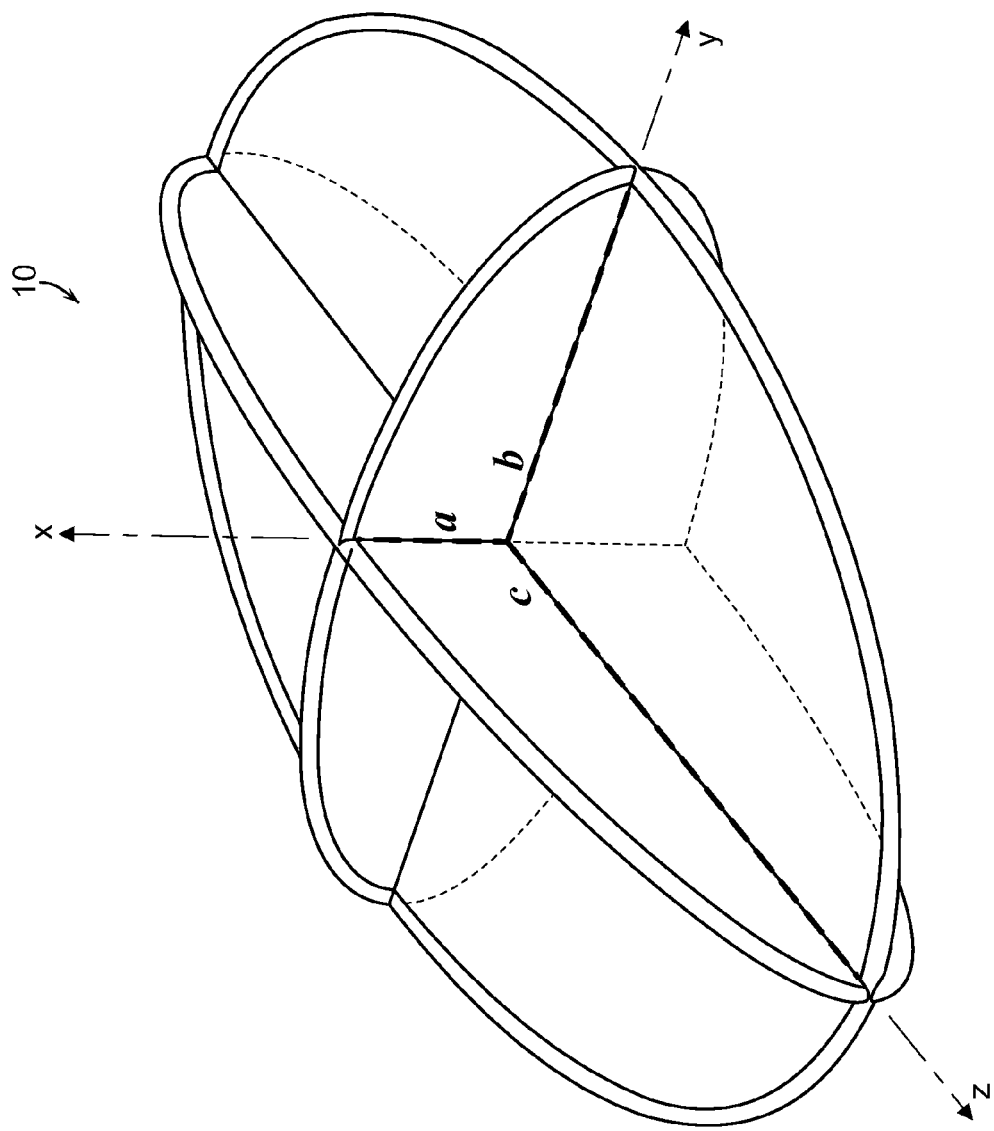

As seen in FIGS. 1-3, one embodiment of the top 10 can be solid, have a length along the major axis z of about 2 inches, and a diameter at the minor axes x and y of about 1.2 or 1.236 inches. The major axis z can be positioned about 0.618 inches away from the outer diameter edge or surface at axes x and y. FIG. 4 shows an embodiment of the top 10 made of brass resting on a surface 11. Embodiments of metal tops can be polished, anodized or electroplated to produce a highly polished surface for aesthetic reasons, and for physics and mathematics demonstrations.

Visual Perception: When the top 10 is spun slowly, or after it is spun rapidly and it has slowed down, the top 10 exhibits a visual illusion where it appears to deform, usually called the "gelatinous ellipse effect." The top 10 provides a three-dimensional realization of this two-dimensional effect. The top 10 can be used in demonstrations of visual perception effects in both formal and informal educational settings.

In addition, using ambient light or additional light sources, reflected images of the lights while top 10 is returning to its horizontal position can be observed. Elliptically shaped light images can be seen, called "Lissajous figures", which can be important in mathematics and engineering.

Mathematics, Art and Aesthetics: It has been asserted for over two millennia that objects (architectural, artistic and mathematical) that include the "golden mean" in their construction are the most pleasing to human beings. The top 10 offers a concrete realization of this assertion for both the visual and haptic (tactile) senses.

Figure 7:
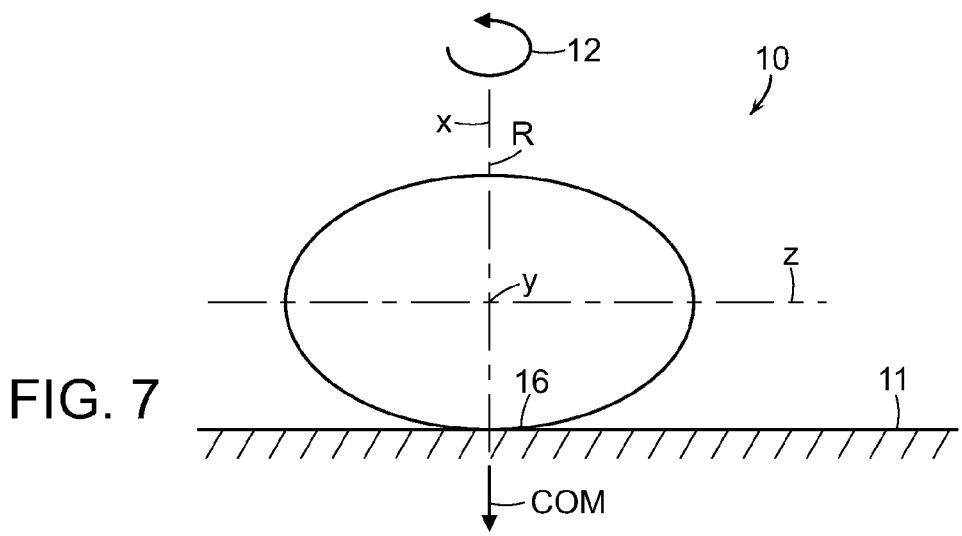
FIGS. 7-9 depict rotational stages of an embodiment of the present invention top during use.
Figure 8:
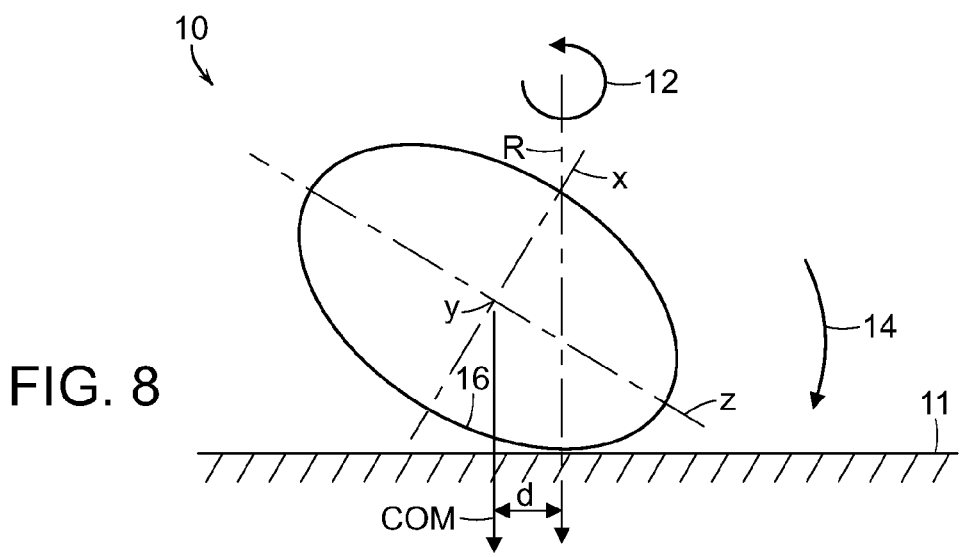
Figure 9:
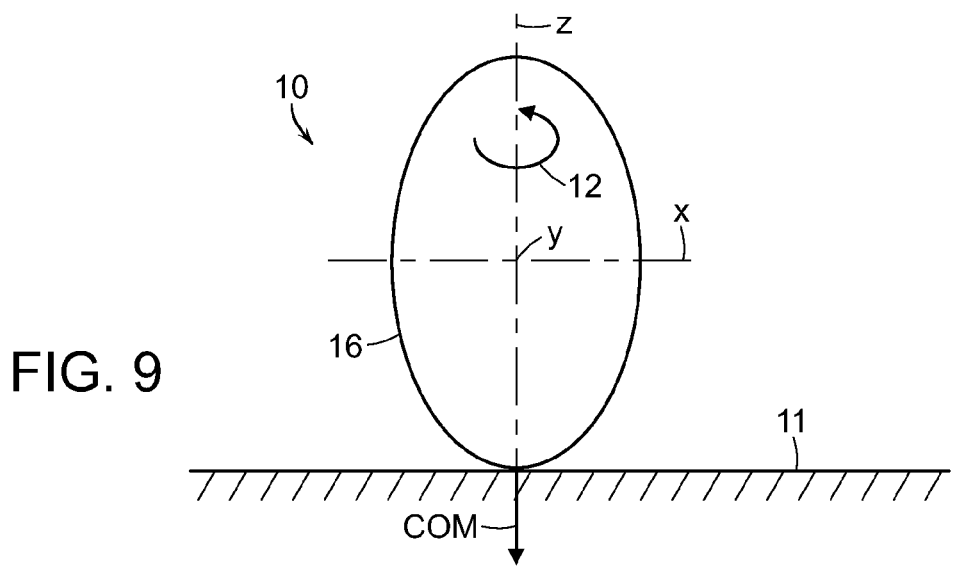

Referring to FIGS. 7-9, in use, top 10 can be spun on surface 11 such as a flat horizontal surface, in the direction of arrow 12, such as by hand, while the major axis z is horizontal, to spin the top 10 about an axis of rotation R, which is also along a minor axis x or y. As the top 10 spins about the minor axis, the top 10 can rock, roll or rotate over the curved surfaces 16 between the minor and major axes in both rolling and sliding friction with both spin and precession motions, moving the top 10 in the direction of arrow 14 while rotating in the direction of arrow 12. The axis of rotation R shifts away from the minor axis and the center of mass COM rises upwardly and offset from the axis of rotation R a distance d. For ratios c/a in the range of about 1-2, the rotation of the top 10 can produce a rotational climbing force large enough to roll the top 10 over the curved surfaces 16 to quickly rotationally climb into a vertical upright position with center of mass COM in a raised position along major axis z, where the top 10 rotates for an extended time with no precession about the major axis z as the axis of rotation R on surface 11. In the upright position, the top 10 can spin about twice as fast than in the horizontal position mainly from the difference of the moments of inertia about the major and minor axes, similar to when a figure skater pulls his/her limbs inward while spinning. As the top 10 loses energy due to friction, it begins to descend from the upright position, with both spin and precession motions, eventually stopping in a horizontal position. Typically a prolate ellipsoid having a ratio c/a greater than 2 will not rotate into an upright position. In addition, some prolate ellipsoids much smaller or larger than those described can have difficulties spinning into an upright position.

While this invention has been particularly shown and described with references to example embodiments thereof, it will be understood by those skilled in the art that various changes in form and details may be made therein without departing from the scope of the invention encompassed by the appended claims.

What is claimed is:

1. A top having a prolate ellipsoid shape of uniform construction with a continuous surface, having a major axis, a minor axis, and a major axis/minor axis ratio of $\Phi=(1+5^{1/2})/2$.

2. The top of claim 1 having an outer surface is defined by the equation:

$$x^2/a^2 + y^2/b^2 + z^2/c^2 = 1$$

in which a, b and c are dimension constants and x, y and z are spatial xyz co-ordinates, and in which a ratio c/a is $\Phi$.

3. The top of claim 2 in which the ratio c/a equals the golden ratio.

4. The top of claim 2 in which a=b.

5. The top of claim 4 in which the top has a length along a major axis of about 1-6 inches.

6. The top of claim 5 in which the length of the top along the major axis is about 2 inches, and the top also has a diameter at a minor axis of about 1.2 inches.

7. The top of claim 4 in which the top is configured to be initially spun on a surface to rotate around a minor axis and to rotationally move to spin about a major axis.

8. A top having a prolate ellipsoid shape of uniform construction comprising:

a continuous outer surface defined by the equation:

$$x^2/a^2 + y^2/b^2 + z^2/c^2 = 1$$

in which a, b and c are dimension constants and x, y and z are spatial xyz co-ordinates, and in which a=b, a ratio c/a is $\Phi=(1+5^{1/2})/2$, the top having a length about a major axis of about 1-6 inches, the top being configured to be initially spun on a surface to rotate around a minor axis and to rotationally move to spin about the major axis.

9. A method of forming a top comprising:
providing the top with a prolate ellipsoid shape of uniform construction with a continuous surface, having a major axis and a minor axis, and a major axis/minor axis ratio of $\Phi=(1+5^{1/2})/2$.

10. The method of claim 9 further comprising providing the top with an outer surface defined by the equation:

$$x^2/a^2+y^2/b^2+z^2/c^2=1$$

in which a, b and c are dimension constants and x, y and z are spatial xyz coordinates, and in which a ratio c/a is $\Phi$.

11. The method of claim 10 further comprising forming the top with a ratio c/a equal to the golden ratio.

12. The method of claim 10 further comprising forming the top where a=b.

13. The method of claim 12 further comprising providing the top with a length along a major axis of about 1-6 inches.

14. The method of claim 13 further comprising providing the top with the length along the major axis of about 2 inches, and a diameter at a minor axis of about 1.2 inches.

* * * * *